United States Patent [19]

Witt et al.

[11] Patent Number: 4,731,737

[45] Date of Patent: Mar. 15, 1988

[54] HIGH SPEED INTELLIGENT DISTRIBUTED CONTROL MEMORY SYSTEM

[75] Inventors: David B. Witt; Brian D. McMinn, both of Austin, Tex.

[73] Assignee: Advanced Micro Devices, Inc., Sunnyvale, Calif.

[21] Appl. No.: 860,608

[22] Filed: May 7, 1986

[51] Int. Cl.$^4$ .............................................. G06F 7/00
[52] U.S. Cl. .................................................. 364/200
[58] Field of Search ... 364/200 MS File, 900 MS File

[56] References Cited

U.S. PATENT DOCUMENTS

| 3,753,238 | 8/1973 | Tutelman | 364/200 |
| 3,970,993 | 7/1976 | Finnila | 364/200 |
| 4,215,401 | 7/1980 | Holsztynski et al. | 364/200 |

*Primary Examiner*—Raulfe B. Zache
*Assistant Examiner*—Michael J. Ure
*Attorney, Agent, or Firm*—Patrick T. King; Joseph J. Kaliko

[57] ABSTRACT

A highspeed, intelligent, distributed control memory system is comprised of an array of modular, cascadable, integrated circuit devices, hereinafter referred to as "memory elements." Each memory element is further comprised of storage means, programmable on board processing ("distributed control") means and means for interfacing with both the host system and the other memory elements in the array utilizing a single shared bus. Each memory element of the array is capable of transferring (reading or writing) data between adjacent memory elements once per clock cycle. In addition, each memory element is capable of broadcasting data to all memory elements of the array once per clock cycle. This ability to asynchronously transfer data between the memory elements at the clock rate, using the distributed control, facilitates unburdening host system hardware and software from tasks more efficiently performed by the distributed control. As a result, the memory itself can, for example, perform such tasks as sorting and searching, even across memory element boundaries, in a manner which conserves, is faster and more efficient then using, host system resources.

56 Claims, 10 Drawing Figures

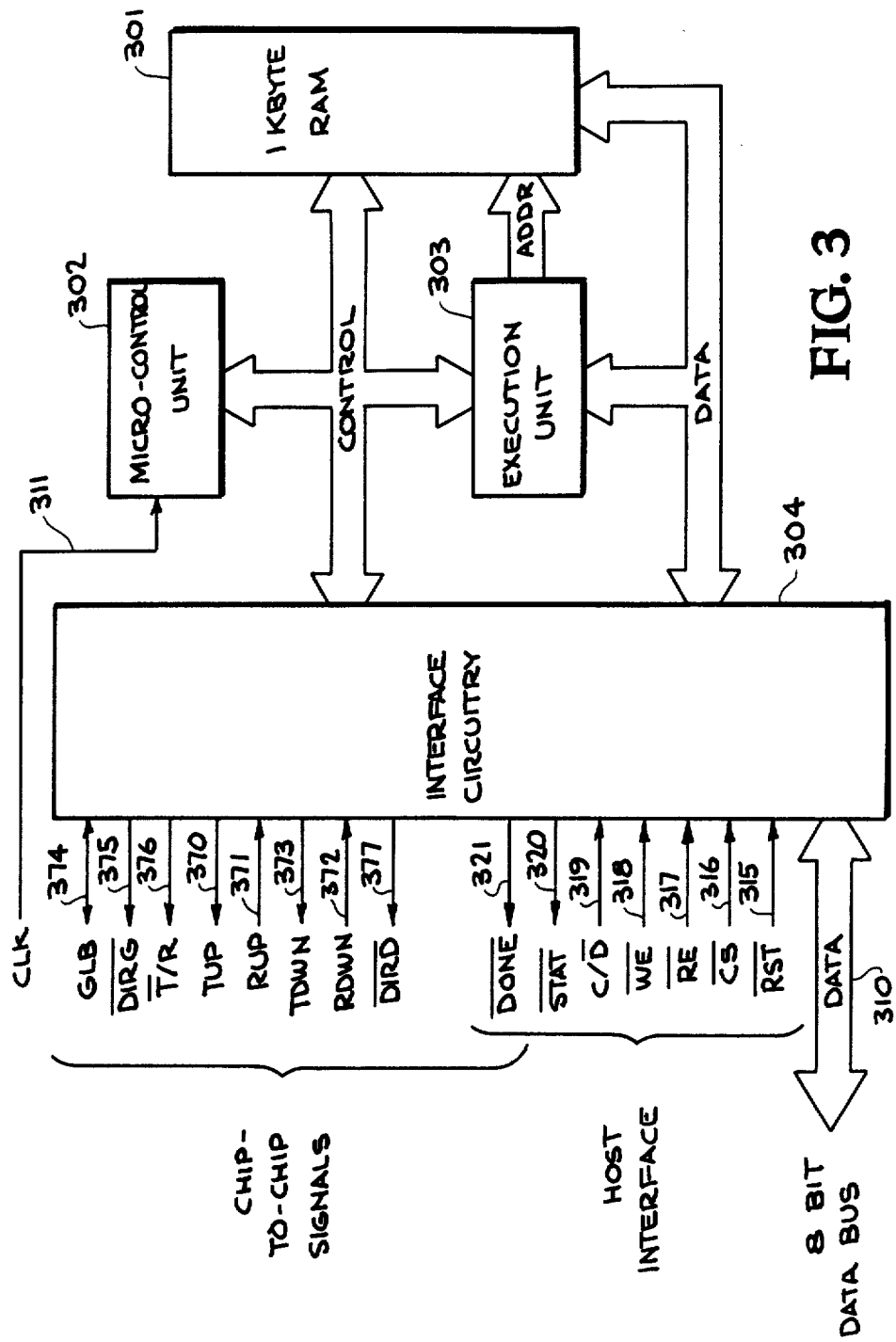

HIGH SPEED INTELLIGENT DISTRIBUTED CONTROL MEMORY SYSTEM

BACKGROUND OF THE INVENTION

1. Field of the Invention

The invention relates generally to memory systems used in digital computing systems and more particularly relates to a memory system which is comprised of a plurality of intelligent memory elements each capable of rapid, direct communications with one another, without host system intervention or supervision.

2. Description of the Prior Art

Digital computers are well known which are comprised of a combination of one or more central processing units (CPU), memory and input/output devices. The CPU is the "intelligence" of the host computer and typically uses memory, both internal and external to the host system, as storage and/or scratch pad space for performing arithmetic and logic operations. The input-/output devices typically provide man/machine interfaces and are means to communicate with external systems, such as other computers, external storage devices, etc.

Memory systems are well known which themselves are "intelligent", i.e., can perform data processing and control functions in parallel with the host CPU. To accomplish this known systems have one or more control units, usually in the form of microprocessors, each dedicated to servicing predetermined portions of memory where the dedicated units act independent of the host CPU, but subject to its control. Such systems are known as distributed control memory systems.

Communications between the host system and the processor units in a distributed control memory system typically involves using an address/read/write scheme in combination with a communications bus. Communications are slow since the independent processing resources compete for time on the bus and all communication, even when effectively between memory elements only, is, in known systems, routed via the host CPU.

Using the known schemes for communicating with distributed control memory, certain operations require tying up the host CPU and the system bus for considerable amounts of time, particularly when a search or sorting operation is in progress. These types of operations, heretofore software oriented, require extensive passing of control between the host system and the distributed control. Even more time is expended resolving the aforementioned contention problem when the hardware architecture of the overall system provides for only a single path communication bus between the host CPU and distributed control memory.

As a result of the aforementioned problems it would appear to be desirable to minimize or eliminate the time consuming software bottlenecks that work to slow computer systems by off-loading, from software to hardware, tedious and frequent tasks, such as those, associated with sorting and searching. Off-loading these tasks would reduce software errors and speed up many applications. Specifically, applications like the creation of constant ordered lists by an operating system would be aided. The creation of these lists is slow and accrues significant overhead on operating-system software. Also, improved speed and reliability in performing the ultra-fast sorting required by specialized applications, such as graphics and artificial intelligence, would be achieved.

It also appears desirable to permit direct communication between the control portions of memory elements in a memory element array, without host system intervention. In addition to facilitating performance of the aforementioned "software" tasks, the host CPU and memory element controllers would then truly operate independently and more efficiently. Particularly in the case where a single shared bus is involved, contention problems would be held to a minimum by taking advantage of the speed with which the memory elements could directly get on to and off of the bus, thereby enabling preselected tasks to be optimally performed by hardware directly.

SUMMARY OF THE INVENTION

The invention comprises a highspeed, intelligent, distributed control memory system which, according to the preferred embodiment of the invention, is further comprised of an array of modular, cascadable, integred circuit devices, hereinbefore and after referred to as "memory elements." Each memory element includes storage means, programmable on board processing means ("distributed control") and means for interfacing with both the host system and other memory elements in the array utilizing a single shared bus.

Each memory element of the array is capable of transferring (reading or writing) data between adjacent memory elements once per clock cycle. In addition, each memory element is capable of broadcasting data to all memory elements of the array once per clock cycle. This ability to transfer data between the memory elements at the clock rate, using the distributed control, facilitates unburdening host system hardware and software from tasks more efficiently performed by the distributed control. As a result, the memory elements themselves can, for example, perform such tasks as sorting and searching, even across memory element boundries, in a manner which is conserves, operates faster and is more efficient than using host system resources.

The key to achieving these results is a memory architecture that permits direct communications between distributed control elements without host system supervision or intervention and which is capable of driving the host system communication bus at a rate of once per clock cycle.

It is an object of the invention to optimize the performance of computing systems by off-loading selected tasks from the host system CPU to distributed control memory.

It is a further object of the invention to permit direct communications between intelligent memory elements in an array of intelligent memory elements, without host system intervention or supervision.

It is still a further object of the invention to optimize the use of the bus structure in a computer system, particularly where the structure is that of a single bus shared by the host system CPU and the distributed control in memory elements.

It is yet another object of the invention to provide a memory element array structure capable of optimally driving a shared bus system, with the preferred embodiment of the invention being capable of driving a single shared bus once per clock cycle.

Other objects, features and advantages of the present invention will become apparent upon consideration of the following detailed description and the accompanying Drawing, in which like reference designations represent like features throughout the figures.

BRIEF DESCRIPTION OF THE DRAWING

FIG. 3 depicts, in block diagram form, the details of one of the memory elements in the array depicted in FIG. 2.

DETAILED DESCRIPTION

Figure 1:
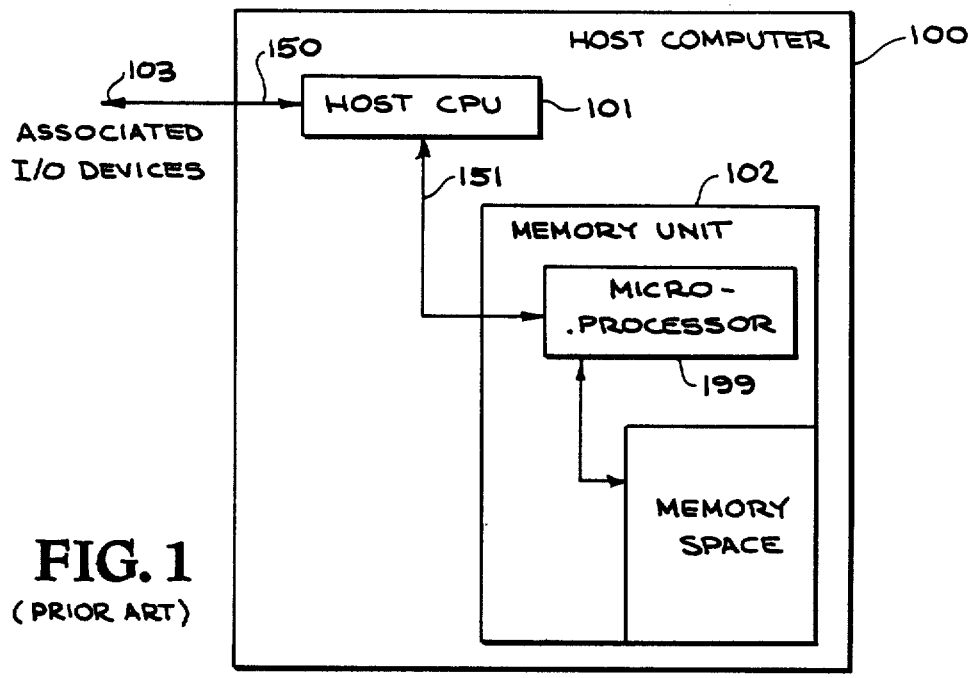
FIG. 1 depicts a prior art computer system that includes distributed control memory.

FIG. 1 depicts a prior art computing system 100 which includes CPU 101, memory 102 and associated input/output device(s) 103. System 100 is also designated in FIG. 1 as the "host computer." Link 150 is shown as a path for communication between CPU 101 and the world outside the host computer. Link 151 is a bus connecting CPU 101 and memory 102.

Also depicted in FIG. 1, as part of memory 102, is microprocessor 199. This device is shown coupled via bus 151 to CPU 101.

As indicated hereinbefore, distributed control memory systems of the type depicted in FIG. 1 are known and permit local processing by microprocessor 199 over the memory space. Such processing is typically controlled by CPU 101 via link 151.

Figure 2:
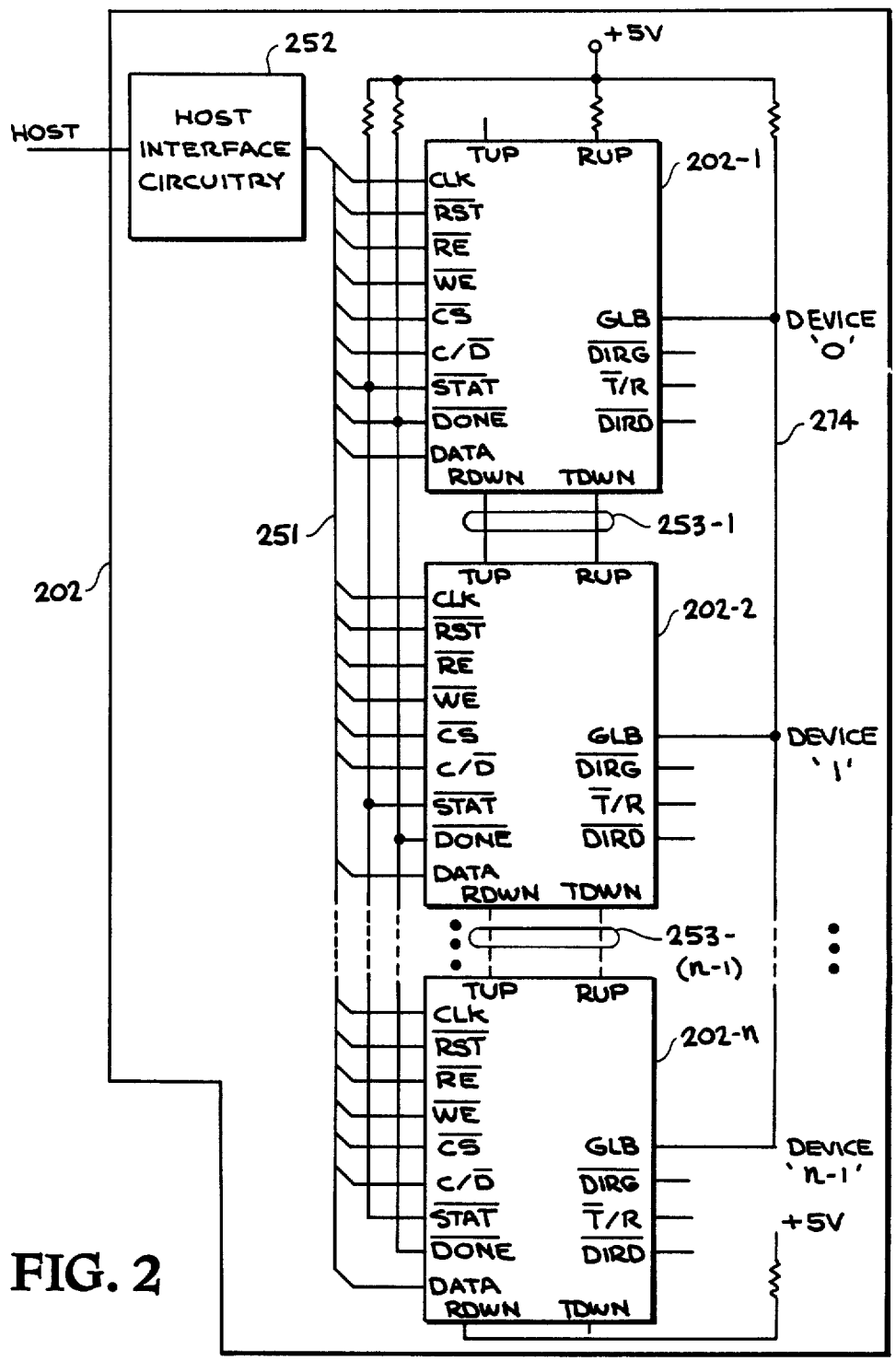
FIG. 2 depicts an array of memory elements each coupled to a shared data bus and other memory elements in the array in accordance with the teachings of the preferred embodiment of the invention.

FIG. 2 depicts the preferred embodiment of the novel architecture contemplated by the invention. FIG. 2 shows a distributed control memory, 202, comprised of an array of modular, cascadable, memory elements. These are shown as elements 202-1 thru 202-n. Each memory element is capable of communicating with the host CPU via bus 251 (similar to the communications link 151 shown in FIG. 1) via interface circuitry 252. Circuitry 252 would typically comprise a transceiver to separate memory element to memory element communications from memory element to host CPU communications.

Each memory element in FIG. 2 is capable of direct communication with adjacent memory elements via interconnection link pairs 253-1 thru 253-x, where $x = n - 1$ and n is the number of memory elements in the array. Each memory element is also capable of memory element to memory element communications (adjacent or not), via bus 251 and other paths shown in FIG. 2, e.g., globel link 274. Both types of communication (adjacent and nonadjacent) can be performed at high speed, without supervision or intervention by the host CPU, in the manner to be described in detail hereinafter.

The purpose and function for each of the interconnections depicted in FIG. 2, along with a description of the application and benefits of the depicted architecture, will also be set forth in detail hereinafter. First, however, a detailed description of each of the memory array components will be set forth, together with a description of inputs and outputs, (control, data and command I/O) to and from each memory element.

FIG. 3 depicts, in block diagram form, one of the modular elements of the array of FIG. 2. As shown by the example of FIG. 2, these elements are cascadable.

Each memory element is comprised of storage means 301, distributed control (shown further comprised of the combination of micro-control unit 302 and execution unit 303), and means for interfacing with both the host system and other memory elements in an array such as the one shown in FIG. 2. The means for interfacing is depicted in FIG. 3 as unit 304 and interfaces with bus 251 of FIG. 2 via the link marked "8 bit data bus", 310. The choice of a bus 8 bits wide is arbitrary and was chosen for the sake of illustration only.

Figure 4:
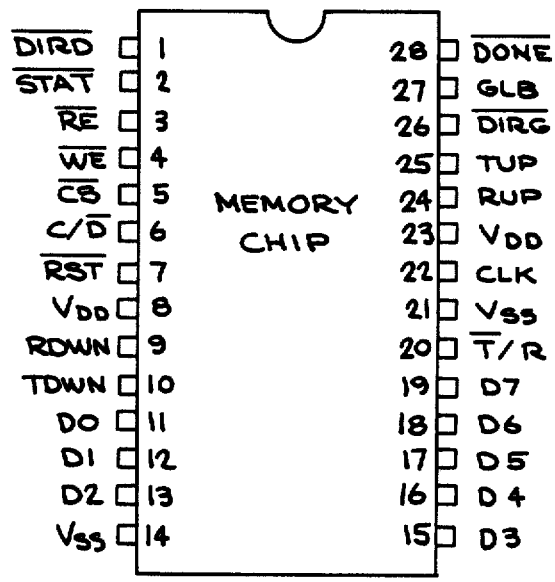
FIG. 4 depicts a pin diagram for a memory chip used in accordance with the preferred embodiment of the invention.

Reference should now be made to FIG. 4 which depicts how the memory element depicted in FIG. 3 may be packaged using a standard 28 pin integrated circuit device. The pin diagram shown in FIG. 4 is intended for use with a chip that functions in accordance with the teachings of the invention by incorporating interface circuitry 304, microcontrol unit (MCU) 302, execution unit 303, storage means 301 (shown as random access memory, "RAM"), and providing for the input and output of data, control, command and timing signals shown in FIG. 3. The purpose and function of each pin depicted in FIG. 4 will be explained with reference again to FIG. 3.

In addition to the functional blocks previously described, FIG. 3 depicts a set of "host interface" and "chip to chip signals" which are inputs to and outputs from a given memory element separate and apart from normal data or command I/O communicated over link 310 and data bus 251. Also shown in FIG. 3 is clock input 311 for synchronizing the operation of memory elements and other overall system components.

The set of host interface signals shown includes $\overline{\text{RST}}$ 315; $\overline{\text{CS}}$ 316; $\overline{\text{RE}}$ 317; $\overline{\text{WE}}$ 318; C/$\overline{\text{D}}$ 319; $\overline{\text{STAT}}$ 320; and $\overline{\text{DONE}}$ 321. $\overline{\text{DONE}}$ 321 is also depicted as a chip to chip signal. The purpose and function of these host interface signals in the preferred embodiment of the invention will be described immediately hereinafter, followed by a detailed description of the chip to chip communication signals.

Equivalents of the host interface signals are well known in the prior art. The host/memory interface signals facilitate distributed control processing by, among other things, putting the memory space that is within the range of a particular processor in a read or write mode. A particular chip, or memory space, can be selected by the host system pulling the $\overline{\text{CS}}$ 316 (chip select) line low. The negative logic convention used in conjunction with the preferred embodiment of the invention was chosen for the sake of illustration only. One of ordinary skill in the art will readily appreciate that positive logic would work just as well. When $\overline{\text{CS}}$ 316 is high, all the read/write inputs are ignored.

$\overline{\text{RE}}$ 317 and $\overline{\text{WE}}$ 318, read and write enable respectively, are also active when low. $\overline{\text{RE}}$ 317 is used to read data from a chip, while $\overline{\text{WE}}$ 318 is used to write commands or data into a chip.

C/$\overline{\text{D}}$ 319, the command/data input signal, when low allows data to be read or written (from or to) a chip; when high commands may be written into a given chip.

$\overline{\text{RST}}$ 315 low signals a chip reset operation. Any command under execution is terminated. $\overline{\text{DONE}}$ 321 goes high. Upon $\overline{\text{RST}}$ 315 going from low to high, the chip in the array depicted in FIG. 2, with its RUP line (the function of which will be described hereinafter) tied to +5V, assumes a chip address of 0, the next chip in the array assumes an address of 1 and so on until all devices number themselves. The reset operation, also referred to as the chip enumeration operation, will be described in detail hereinafter. It should be noted that the reset operation can be triggered by $\overline{\text{RST}}$ 315 being pulled low, or via a host issued RST (reset) command. The RST command will be described hereinafter in conjunction with the description of the command set utilized in the preferred embodiment of the invention.

The wire-or'ed $\overline{\text{DONE}}$ 321 lines shown in FIG. 2 signal completion of the reset cycle by going low. In general the $\overline{\text{DONE}}$ 321 output (active low) indicates the termination of an operation. This signal goes high at the beginning of new commands, data writes, or data reads, and then goes low when done with the current operation. This host interface signal is, as indicated before, used in chip to chip communications as well.

As a chip to chip signal $\overline{\text{DONE}}$ 321 is effectively bidirectional, i.e., one chip can signal the completion of an operation (output) and the wire-or'ed lines see an input signal. This is one way in which the novel architecture is used to broadcast control information from chip to chip.

Finally, the $\overline{\text{STAT}}$ 320 output being low, according to the preferred embodiment of the invention, signals an exception condition following the execution of an instruction. This output goes high at the beginning of a new command, or when a write or read is initiated.

The chip to chip communication signals for a given chip are shown as TUP 370, RUP 371, RDWN 372, TDWN 373, GLB 374, $\overline{\text{DIRG}}$ 375, $\overline{\text{T/R}}$ 376 and $\overline{\text{DIRD}}$ 377.

TUP 370 (transmit upward), RUP 371 (receive from the up direction), RDWN 372 (receive from the down direction) and TDWN 373 (transmit downward) are all active when high in the preferred embodiment of the invention (low would work just as well). RUP 371 and RDWN 372 are inputs to a given chip, TUP 370 and TDWN 373 are outputs. There also exists a test mode in the preferred embodiment where TUP and TDWN are bidirectional.

The purpose and function of these signals in the context of the invention will be described hereinafter with reference to how a chip array operates to perform specific operations. These operations were chosen to illustrate that the novel architecture can be used to realize the previously set forth objects of the invention. In particular, chip enumeration, passing tokens from chip to chip, performing hardware binary searchs, pushing and popping data into and from the memory array, broadcasting data from a given chip to others in the array, performing jamming operations and resolving contention problems among chips will all be described hereinafter in detail.

The explanation of how these operations are performed will not only illustrate the purpose and function of the chip to chip communication signals in the context of the novel architecture, but will also demonstrate how the hardware actually operates and how it is able to off-load traditionally software oriented tasks, e.g., binary search, etc.

Before detailing these operations and their implementation, the remaining chip to chip signals need to be briefly characterized.

GLB 374, a bidirectional signal, will be seen as useful in implementing the broadcast, jam and contention resolving operations. An example of its use will be set forth hereinafter.

The output signals $\overline{\text{DIRG}}$ (Direction of GLB) 375, $\overline{\text{T/R}}$ (transmit/receiver) 376 and the $\overline{\text{DIRD}}$ (direction of done) 377, are used in the preferred embodiment of the invention to facilitate interfacing banks of modular chip devices to one another. With one chip bank, these lines are not used, as shown in FIG. 3. If the number of devices in a bank (according to the preferred embodiment) exceeds 16, the designer can either reduce the clock frequency to the parts, due to increased capacitance, or insert a buffer circuit between banks of devices to allow operation at optimum speed.

In the first case (reducing clock frequency) $\overline{\text{DIRG}}$ 375, $\overline{\text{T/R}}$ 376 and $\overline{\text{DIRD}}$ 377 are not used. In case two, $\overline{\text{DIRG}}$ 375, $\overline{\text{T/R}}$ 376 and $\overline{\text{DIRD}}$ 377 may be used to control (enable and tristate) the buffer circuitry which facilitates the communication with other banks of chips.

The pin diagram of the 28 pin package set forth in FIG. 4 can now be better appreciated as providing for all the inputs and outputs described above with reference to FIG. 3. The remaining pins shown in FIG. 4, and not described above, are the 8 pins (D0-D7) associated with bus link 310 of FIG. 3 and the 2 $V_{dd}$ and 2 $V_{ss}$ pins which are coupled, in the preferred embodiment, to a +5 volt power supply ($V_{dd}$) and ground ($V_{ss}$), respectively. Pins D0-D7 carry data and commands between a given chip and the system bus.

FIG. 3 goes on to show, in broad block diagram form, the flow of "control" and "data" between the major circuits on a given chip.

MCU 302 is the distributed "intelligence" (with respect to the host) embedded in each chip. A microsequencer such as the AMD 2911A, off-the-shelf memory, an EPROM and simple MSI TTL glue logic, combined as taught by Dietmeyer in "Logic Design of Digital Systems", published by Allyn and Bacon of Boston, Massachusetts (copyright 1971), chapter 6.2, would be sufficient to realize a micro-control unit, like MCU 302, which is capable of executing sequences of hardwired micro-code to perform preselected operations.

MCU 302, functions in response to a preselected command set specified by the unit designer. Each command of such a set initiates a predetermined micro-code sequence, to selectively process and pass data and control signals between the host system, other memory elements in the array, and internally among the on-chip circuits and memory.

The preferred embodiment of the invention utilizes a set of 16 commands to set various pointers, masks, etc. These will be described in detail hereinafter. For now, however, as an example of one such command, the preferred embodiment calls for a GSF command (Get Status Full) to cause MCU 302 to check status flags to see if a given memory array is full. The particular command set desired is application dependent and well within the ability of those skilled in the art to design for any given application.

In the preferred embodiment of the invention MCU 302 outputs a 47 bit micro-code word. 17 bits of the micro-code word specifies the address of the next micro-code instruction. The remaining 30 bits of the code word are actually a set of control signals which are communicated to the other on broad chip units, i.e., memory 301, execution unit 303 and circuitry 304.

The number of bits chosen for the MCU 302 output micro-word in the preferred embodiment of the invention is application dependent and not limiting insofar as describing the invention per se.

Execution unit 303 (part of the distributed control) is comprised of arithemetic logic units (ALUs), incrementers, comparators, and other registers, operated under the control of MCU 302. Devices, such as unit 303, are well known for performing address calculations, data manipulation and conditional branch calculations for a MCU control unit such as MCU 302. Status information is also monitored by unit 303. In the preferred embodiment of the invention unit 303 is a 10 bit unit comprised of AMD 2900 series bit slice ALUs, standard TTL latches, incrementers and glue logic, well within the skill of the art to construct, given the application. Execution unit 303 also generates, under the control of MCU 302, the address pointer into storage device 301.

Storage device 301 is, in the preferred embodiment of the invention, a novel 1 K-byte RAM. The novel RAM is described in detail in copending U.S. patent application Ser. No. 838,993 filed Mar. 12, 1986 by the assignee of this application. Application Ser. No. 838,993 is hereby incorporated by reference. This particular RAM is organized and operable in such a fashion as to support implementing sort operations such as a "sort by insertion", which is one of the operations performed by the hardware described herein and explained in detail hereinafter. However, the instant invention does not require, and is not limited to use with, the novel RAM. Any RAM cooperating with the other on chip units to store and retrieve data would be sufficient for the purpose of the current invention.

FIG. 3 goes on to depict interface circuitry 304 coupled to "control" and "data" paths within the chip, and coupled to the depicted pin outs shown in Both FIG. 3 and 4. The "control" path includes a command bus which is used to route any one of the predetermined commands being sent by the host systems over bus 251 and link 310, to MCU 302 for execution. The "data" path includes a data bus (again, internal to the chip) which carries data between link 310, storage 301 and selected registers in execution unit 303.

Interface circuitry 304 may, according to the preferred embodiment of the invention, be viewed as having two separate cooperating parts.

The first part comprises standard, off-the-shelf logic which is used to pass buffered control and status signals to MCU 302 wherever an input is presented to circuitry 304, other then from link 310, in FIG. 3. Standard, off-the-shelf logic, is also used to drive output signals where an output or bidirectional link is indicated with respect to circuitry 304 in FIG. 3. In both of these cases the buffering is performed under the control of MCU 302.

The second part of circuitry 304 comprises the logic to field data and commands taken off the system data bus via link 310. This includes logic to distinguish commands from data and to route commands and data onto appropriate internal buses. Commands are routed to MCU 302 on an internal command bus. Data is routed to execution control unit 303 and memory 301 on an internal data bus.

Commercially available logic for accomplishing these specific functions is well known to those skilled in the art. For the purposes of the invention, however, the key concept to be reiterated is that circuitry 304 functions to route chip to chip signals, host interface signals, and command and data as well, to and from on chip units as described hereinbefore, and that implementation of a suitable interface circuit can be achieved by using standard, off-the-shelf logic and well known combinatorial logic techniques.

Figure 5:
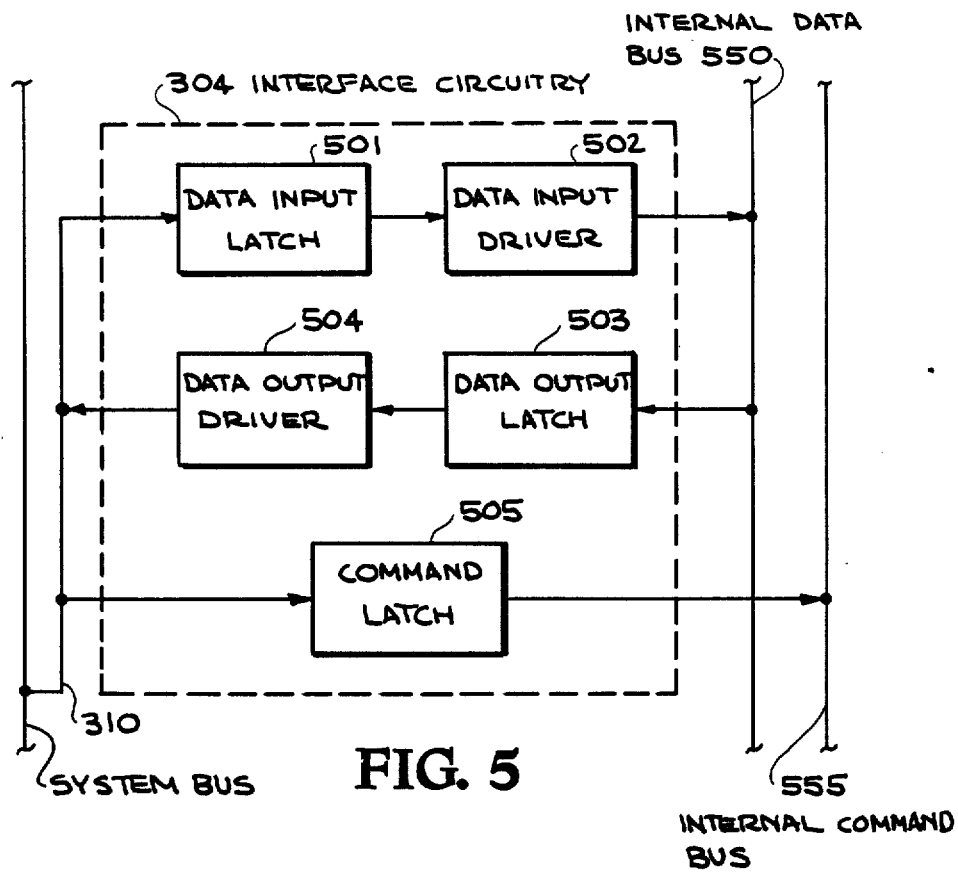
FIG. 5 depicts the latches and driver circuits used in the preferred embodiment of the interface circuitry shown in FIG. 3.

The above referenced second portion of interface circuits 303 is operative, in the preferred embodiment of the invention, to pass commands and data between link 310 and the internal buses in a manner depicted in FIG. 5.

FIG. 5 shows the combination of data input latch 501 and data input driver 502 coupled between the external data bus link 310, and the aforementioned internal data bus 550. FIG. 5 also shows data output latch 503, and data output driver 504 coupled between internal data bus 550 and link 310, for outputting data onto the system bus. Finally, FIG. 5 also depicts a command latch 505, for receiving commands off link 310 and for routing these commands to the aforementioned internal command bus 555.

Each of the depicted latches is enabled or disabled, and the drivers are either driving or tristating the respective buses shown, depending on the presence of absence of the various signals described hereinbefore. For example, the command latch is enabled when the $\overline{C/D}$ 319 input is high, otherwise it is not enabled, etc. Here is where the collection of signals from the host system, interchip signals and micro control unit generated signals are all utilized to actually synchronize the placing of data and the taking of data (and commands) off the system bus.

Prior to proceeding with the description of the actual command set implemented in the preferred embodiment of the invention, and a description of the various operations implemented to achieve the objects of the invention, the various inputs and outputs to and from MCU 302 in the preferred embodiment of the invention will be recapped and summarized.

First, MCU 302 receives as input:
  (a) commands via the internal command bus;
  (b) buffered control signals from the host system via circuitry 304; (note, these same signals, e.g., read enable and write enable, are used in the portion of circuitry 304 depicted in FIG. 5 to control the loading, enabling, driving and tristating of the depicted latches and drivers); and
  (c) buffered control signals from adjacent chips, e.g., the signals on RUP 371 and RDWN 372.

It should be noted that the preferred embodiment of the invention provides for a direct input path for interchip signals input on links RUP 371 and RDWN 372 to the control for the latch and driver circuits shown in FIG. 5. This design criteria eliminates having to involve MCU 302 in certain interchip operations, in particular in implementing the "wait-box" scheme to be described hereinafter in conjunction with certain of the hardware operations. The highspeed, once per clock cycle operation of the invention is in part achieved by the direct input of these control signals to where they are needed, when they are needed, to control the latches and drivers.

The principle output of MCU 302 is, in the preferred embodiment, the 47 bit micro-code word described hereinbefore.

Finally, with respect to FIG. 3, clock signals from the host system are shown input to MCU 302 via link 311. In fact, the clock input is shared by all the array elements with each element taking the clock input and generating two non-overlapping onboard clock signals. These signals are used for building synchronization logic and inputs for each of the onboard units described hereinbefore. According to the preferred embodiment of the invention the clock signal should be between 1 megahertz and 16 megahertz, although this is not a factor limiting the concept of the novel architecture.

For the sake of illustration and completeness, the actual command set implemented in the preferred embodiment of the invention will now be set forth in detail.

The preferred command set is divided into 5 groups, (1) the set-up control group; (2) the status group; (3) the address specification group; (4) the addressing mode control group, and (5) the command group.

The set-up control group contains the RST (reset) and the KPL (load K, P, L) instructions. RST is equivalent to a hardware reset and is followed by the enumeration process which was mentioned hereinbefore and which will be described in detail hereinafter. The KPL instruction is the means by which software controls the variable width record organization of the novel RAM structure described in the copending patent application incorporated hereinbefore by reference. This instruction defines the number of bytes in the key (K), the number of bytes in the pointer (P), and the last address (L) of each chip in the array, which specifies the number of logical records each memory on a given chip contains. Each record is thus containing K+P bytes, of which K bytes are the key and P bytes are either the remaining bytes in the record or a pointer to the physical record in the main memory.

The status group contains just one instruction, the GSF (get status full). The chips respond to this instruction via the STAT pin to inform the host if the array is full.

The address specification group contains six instructions which control the two basic active pointers, the record pointer, and the byte pointer. At any point in time these pointers are active only in one of the chips in the array, the one that was associated with the last record accessed. After reset, both pointers point to the top of the array. RRB (restore record boundary) restores the active byte pointer to point to the current record boundary. NXT (next) sets the byte and record pointers to the next record boundary. PRE (previous) sets both pointers to the previous record. DEC (decrement) decrements the byte pointer to set it pointing to the previous byte. LAL (load address long) loads the byte pointers with an 18-bit value in all the chips of the array to allow for random access anywhere within the array. The most significant 8 bits specify which chip should become the active one and the least significant 10 bits specify the byte address in this chip. The active chip is the one whose number in the cascade is equal to the most significant 8 bits, where, as in the preferred embodiment, 256 chips comprise the largest array. The LAS (load address short) loads only the least significant 10 bits to allow for random access within the currently active chip.

The addressing mode control group contains four instructions. RND (random access) sets the addressing mode to random access and auto-increment. The initial address is specified by a previous LAL or LAS instruction. Then, each read or write increments the active byte pointer. STK (stack mode) places the chips in the stack addressing mode. The active byte pointer becomes a top of stack and subsequent reads or writes physically moves all data below this byte pointer but does not change the pointer. Read pops the byte at the byte pointer and moves all data below it up. Write pushes a byte on the array at the byte pointer moving all data below down. This allows for insertion or deletion of records without resorting the data. LUD (load unsorted data) allows loading the array with unsorted data at up to the maximum bus rate. This data can later be sorted by issuing the SOF (sort off-line) instruction. The SON (sort on-line), on the other hand, sorts data as it is loaded.

The last instruction group, the command group, contains three instructions. SMB (set mask bytes) loads K mask bytes into the chips. These bytes will be used to mask out unnecessary bits in the key for the sort or search instructions. SOF (sort off-line) sorts the data loaded into the array by a previous LUD instruction. FND (find) is used to conduct a search on the array following a sort.

To take advantage of the flexibility of the unique memory array, several different addressing modes are possible in the preferred embodiment of the invention. Any byte location can be addressed in random by loading the byte pointers, either via a LAL or a LAS instruction. If subsequent bytes are required, the auto-increment capability of the RND instruction can be utilized. On the other hand, if insertions or deletions are required anywhere in the array, the STK access mode can be used. The top of stack can be set anywhere by loading the byte pointer via the LAL or LAS instructions. Finally, following a sort, FND instruction can be used to achieve content-addressable access. Following a FND instruction a chip may be read to acquire the record just found. The active pointers are set to the beginning of that record. Furthermore, accesses of records in the vicinity of the active record can be easily conducted via the NXT or PRE instructions.

Two methods of sorting are possible, sort on-line or sort off-line. For both, the host must first define the file by setting the proper key and pointer lengths with the KPL instruction. This organization of the record into key and pointer fits the popular relational data-base organization. Next, if masking is desired, K bytes of mask are set with the SMB instruction. For example, bit 5 of each key may be masked-out allowing for sorting or searching of test without regard to upper and lower case characters.

Of the two sort methods, sort off-line is the most efficient. It is usually preceeded with a LUD instruction which loads the array with all the data to be sorted at the maximum bus rate. Then, a SOF instruction is issued to sort that data. While the sort commences the CPU is freed to perform any other task. If another sort is later required on the same data but with a different mask, only a SMB instruction followed by a SOF instruction are required.

The command set of the preferred embodiment of the invention also gives the user the option to sort on-line, where the data may be loaded via the programmed I/O in a slower sort-as-you-go method, using the SON command. Here the programmer loads a record and then waits for the distributed control memory to position it in sorted order before the next record is loaded. This mode is useful for data received from a relatively slower I/O device (like a disk), which must be sorted before sent to its destination. In this case the I/O time can be efficiently utilized since the sort and I/O are done in parallel.

The $\overline{\text{DONE}}$ 321 line signals the completion of the record positioning operation in both sort modes.

Having described the instruction set for the preferred embodiment of the invention, and the various addressing modes, it should now become clear how the novel architecture may be used for software booster applications.

Sorting and searching data are tasks implemented by both application software and operating systems.

A data-base file search, for example, usually involves creating an index file which consists of a sorted list of the key values of each record accompanied by a pointer to the physical record. Data-base operations are usually conducted by unions, intersections, or joins of such index files to create a final index file. This is performed via searching into these index files.

Creating an index file via software requires slow sorting routines and many accesses to each record in the original file, which further limits the speed of such operations.

By utilizing the invention to create such index files the data base is accessed just once for each record and no software sorting routines are required. If later a new index file is required based on the same data but with a different key, usually it can be done in place by just changing the mask bytes in the array devices.

A new index file for a totally new data organization can be easily accomplished by reconfiguring, under software control, the record length in the array devices. Later, if a search is required it is done via hardware, having each chip utilizing a binary search operation, to be described in detail hereinafter, in parallel with all the other devices.

Finally, the sort on-line can be used to efficiently utilize the I/O time when a file is read out of a disk, sorted and either written back into the disk or placed in the main memory.

The invention can be equally useful in creating and searching the frequently generated ordered task lists for operating system software. These tables are usually smaller than data-base index files, and require just a few of the preferred embodiment chip devices for a typical environment. Since handling these lists poses a significant overhead on any operating system software, basically any software system can greatly benefit from the invention.

Data-structure and list manipulations are other tasks that heavily burdens both application software and operating systems. Parsing the data-structure (computing the addresses necessary to retrieve the data) usually requires close host attention and runs at a sub-multiple of the bus rate. In addition, the data-structure can impart a logical addressing mode to replace the physical addressing mode of the main memory. By utilizing the flexible-record feature of the preferred array devices, most data-structures and list-manipulation operations are actually moved into the silicon. The KPL instruction is used to configure the data structure by width. The data-structure can be parsed proceeding from a specified address or the array devices can provide the subsequent addresses, either by utilizing the auto-increment capabilities or the associative (content addressable) capabilities, described hereinbefore, of the invention.

This will eliminate the slower software parsing of the data-structure, decreasing the overall software lines of code, increasing the parsing speed, and allowing the programmer to concentrate on his algorithm instead of worrying about the details of setting-up, initialization and address generation for the data-structure. Other benefits include shorter schedules, easier to verify and less costly software, and possibly more relocatable programs that can be easily transferred from one machine to another.

Having described the hardware, command structure and various applications for the preferred embodiment of the invention, a description of the various operations performed to realize the initial objectives outlined herein will now be set forth.

The operations incorporated into and performed by the hardware of the preferred embodiment of the invention are (1) enumerating chips; (2) moving a pointer from one chip to another, across device boundries, to facilitate the hardware operations of pushing (sorting by insertion) and popping of data; and (3) performing hardware binary searches, including the performance of various operations incident to such searches which take advantage of the global line connected to all the array elements. These global operations include, broadcasting control information to distributed processors, jamming distributed processors to preselected addresses (routines) and operations using the global line to resolve chip vs. chip contention problems.

The chip enumeration operation results in each chip getting an identification number so that it knows where it is in the array. This is important for the host system to be able to address a particular chip and will be seen to be important in dealing with contention problems by assigning each chip a unique value.

The first and last chip of the array are known because, as shown in FIG. 2, their RUP 371 and RDWN 372 input lines respectively are wired to +5 V.

The chip shown as "device 0" in FIG. 2, the first chip, begins the enumeration process in response to, according to the preferred embodiment of the invention, the aforementioned RST (reset) command or the $\overline{\text{RST}}$ 315 line being pulled low. The command would typically be sent by the host system over a chip's command port input latch, shown in FIG. 5 as device 505.

The first chip signals the next chip in the array (shown as "device 1" in FIG. 2) that it (device 0) knows its number. The signalling is performed directly chip to chip using, the first chip's TDWN 373 line which goes into the RUP pin of the second device (device 1) of the array. The first chip then puts its identification number plus 1 onto the system bus. The second chip in the array, the one that had its RUP input signalled by the previous chip's TDWN output, reads the bus, thereby learning its identification number, and then increments the value of the transmitted identification number, etc. This sequence is repeated until all the chips know their identification number. The sequence stops when the chip with its RDWN line tied to +5 V has obtained its identification number.

It can be seen that the enumeration process takes place independent of host system supervision or intervention, being totally performed by the distributed control memory system itself using the system bus and the aforementioned interchip lines and signals.

The next operation to be described is the ability of the distributed control hardware to pass a pointer (sometimes called a token) from one chip to another. The purpose of this operation is to enable the distributed memory elements to cooperate with one another, passing control back and forth as appropriate and necessary. The manner in which this is done and the utility of this operation will be demonstrated hereinafter with respect to implementing the push and pop operations.

The passing of a token is accomplished by an active chip signalling an adjacent chip that it is going into an idle state and that the adjacent chip is to take over.

Under the pointer passing operation scheme, only one chip (with pointer into its memory space) is "awake" at a time. Other operations take place with several or all other chips active at once. In particular, the binary search operation, to be described in detail hereinafter, by contrast has all chips "awake" as the search commences.

The operations of pushing and popping data, which involve adding or deleting records from an ordered list, utilize the aforementioned passing token scheme. The pop operation will now be described in detail Reference should be made to FIG. 6 which is a timing diagram for the pop operation.

The host system typically initiates a pop sequence. This can be facilitated by the execution of the aforementioned STK (stack address mode) command followed by a read signal. Whether initiated in this manner or via some other means, the point is that the hardware is capable of taking over after these signals and actually performing the pop (or push) without host intervention. In the preferred embodiment, all the elements in the array become aware that a pop is being called for following the STK command and read signal. It should be recalled that following a STK command, a read enable signal will cause a specified byte to be poped and is intended to cause all the data below the specified byte to be moved up.

In the preferred embodiment of the invention the pop operation starts at the bottom of the array. Using a 3 chip example, with the chips labeled 0, 1 and 2 (starting from the top of the array), the sequence of passing data and control may be seen with reference to FIG. 6.

Chip 2 (assuming its the bottom of the array) prepares to send a byte of data to chip 1 on the external, system data bus (bus 251 in FIG. 2). This "preparation" takes place by chip 2 causing the data which is to be popped across the chip 2/chip 1 boundary to be read from chip 2's RAM 301 and be placed in output latch 503 of chip 2's circuitry 304 This is presumed to have occurred just before the start of clock cycle 1 shown in FIG. 6.

Figure 6:
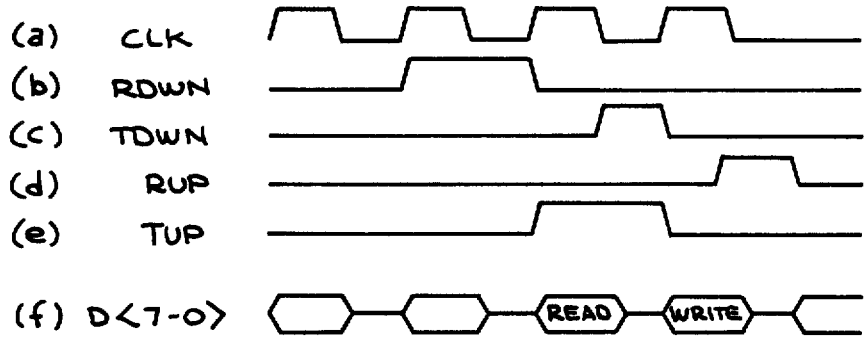
FIG. 6 is a timing diagram illustrating the sequence of events in a "pop" operation performed directly by the distributed control memory.

For the sake of illustration the full clock cycles shown in line (a) of FIG. 6 each start with the first rising edge of a pulse and continue until just before the start of the next rising pulse. Each half clock cycle is hereinafter referred to as a "picket".

The RDWN 373 line of chip 1 (shown on line (b) of FIG. 6) is driven by the TUP 320 line of chip 2. This tells chip 1 that in the following clock cycle chip 2 will be writing a byte (the one in its output latch) onto the system data bus and that chip 1 is to read this data off the bus.

This RDWN signal is shown in FIG. 6 to occur at the start of clock cycle 1 (see line (b) of FIG. 6 going high). This signifies that the read window (see line (f)) is to begin at the start of clock cycle 2.

The TDWN 373 signal (from chip 1 to chip 2) is used to acknowledge receipt of data by chip 1 from chip 2. This "I've got the data latched, you can take it off the bus now" handshake avoids two chips trying to write to the bus at once or having data insufficiently latched.

This handshake/acknowledge signal, shown in FIG. 6 on line (c) during clock cycle 2, defines the outer edge of the read window shown on line (f) to have occurred completely during clock cycle 2.

The handshake/acknowledge signal is what enables the novel architecture to perform the required reads and writes in a one clock cycle interval, versus a three or more picket interval required by known devices.

FIG. 7 (7a-7d) depicts how this is accomplished with a set of four timing diagrams.

Figure 7A:
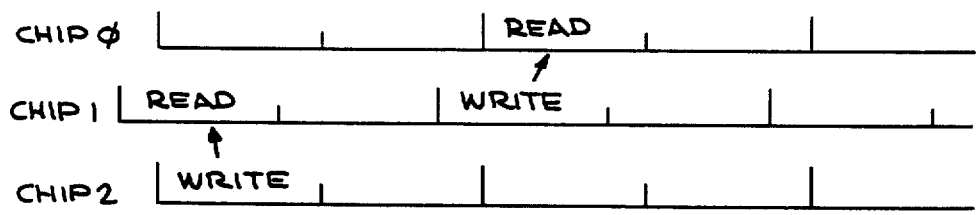
FIGS. 7a-7d depict how the handshake/acknowledge signalling, implemented in the preferred embodiment of the invention, is used to accomplish safe, once per clock cycle, data transfers across memory element boundries.

FIG. 7a depicts a case where a write (for a pop operation) is attempted within a 1 picket window. A worst case clock skew is assumed in each of FIGS. 7a-7d, which is reflected by chip 1's time frames being shown starting a little before chip 0's and chip 2's in each of the four examples.

Still referring to FIG. 7a, in the first picket of the first clock cycle chip 2 is shown writing to, and chip 1 is shown reading from,the system bus with no problem. During the next clock cycle it becomes clear that the 1 picket write window is insufficient to insure the data gets from chip 1 to chip 0 because a part of chip 0's read cycle takes place after chip 1 has stopped broadcasting. Here the clock skew can be seen to possibly cause the chip 0 read to fail.

Figure 7B:
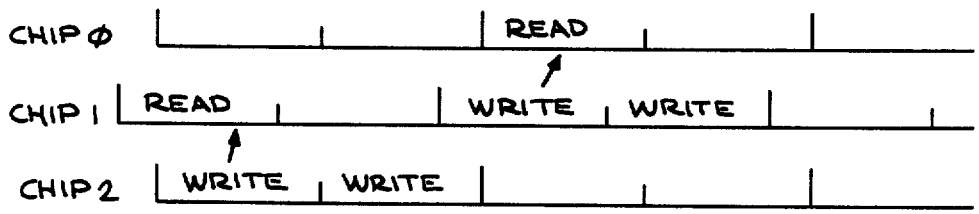

In FIG. 7b, where a two picket write, without handshake, is assumed, a possible conflict situation arises. Here chip 2 writes for 2 pickets which actually extends into the second clock cycle for chip 1. If chip one, thinking everything is O.K., starts to write at the start of cycle two in order to pass data to chip 0, a conflict situation arises with two chips (chip 2 and chip 1) simultaneously trying to use the bus.

Figure 7C:
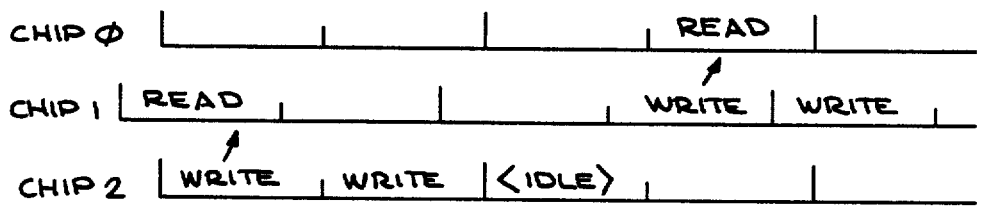

FIG. 7c reflects the optimal situation from a conflict avoidance and insured read point of view, if no handshake signal is involved. Here a 3 picket operation is demonstrated which, although eliminating the problems shown in FIGS. 7a and 7b, is too slow to realize the highspeed objectives of the novel architecture. It can be seen with reference to FIG. 7c that the 3rd picket of the three picket write (shown as "idle" with respect to chip 2) creates a safety zone to avoid a conflict with the write of chip 1, the chip 1 write is constrained to wait until the 3rd picket after the preceeding chip 1 operation (a read) commences. Again, the conflict of FIG. 7b is solved, but the operating speed is only ⅔ as fast as a one clock cycle operation.

What FIGS. 7a-7c show is that transferring data from chip to chip at the fastest possible rate requires a tristate time during each data transfer so two chips do not write on the bus at the same time and also requires that the chip doing the writing, write as long as the chip that's doing the reading continues to read.

Figure 7D:
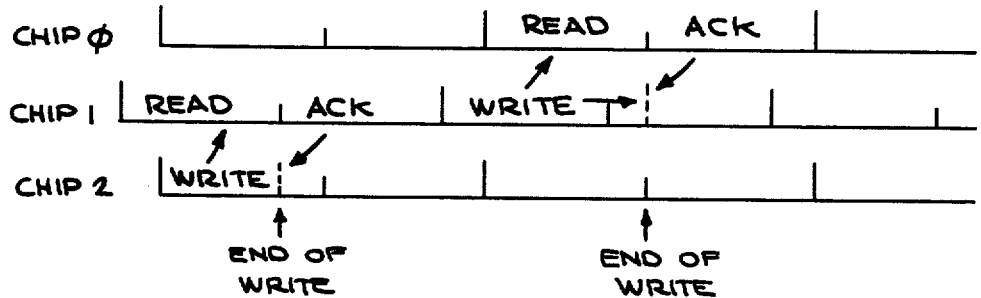

The solution to the above problems and the way in which the aforesaid requirements are met is shown in FIG. 7d. This is the solution implemented by the invention. Using what was just a communication line (TDWN to RUP) as an acknowledge signal from chip 1 to chip 2, allows one clock picket to be safely squeezed out of each transfer.

The ACK signal shown in FIG. 7d, from chip 1 to chip 2, effectively terminates the chip 2 write, freeing the bus for the chip 1 write during the next clock cycle. The ship 0 ACK signal to chip 1, similarly terminates the chip 1 write within 2 picket window. The result is that using the interchip communication lines, as indicated hereinabove, the desired high speed (once per clock cycle) operation is achieved.

Returning to a consideration of FIG. 6, it can be seen by reference to line (f) that following the read during clock cycle 2, the bus is used for a write during cycle 3. This is the chip 1 to chip 0 write which is signalled to take place at the start of cycle 3 by the TUP line of chip 1 going high at the start of cycle 2 (see line (e) of FIG. 6). When the data is latched by chip 0, during clock cycle 3, it drives the RUP line of chip 1 (as shown on line (d)) to tristate the data The push operation may be thought of as the inverse of pop and may be implemented accordingly.

These two operations demonstrate how data is passed across chip boundries on a once per clock cycle basis which makes maximum use of the bus. These operations also demonstrate how the hardware itself may be used to insert or remove data from a stack without host system hardware or software intervention.

The passing of control from memory element, to memory element in the array is accomplished by using the interchip links as described above. In the example discussed with reference to FIG. 6, first chip 2 is active, then chip 1, then chip 0, each going idle when all the data with the RAM of a given chip has been moved up and control passed to the next chip.

The pop operation just described demonstrates another feature of the invention, the "wait-box" feature. Each micro control unit functions to, under preselected circumstances, wait (or idle) unitl an external event is signalled. When a pop is initiated, each chip knows data will come from below, so it waits on its RDWN 372 line before going active.

Another feature of the invention is the jam feature. This is the ability of each chip to force all other chips in the array to a known state to, for example, synchronize multichip operations, to stop activities in progress by other chips, etc. This will be seen as being useful in terminating a binary search operation, to be described hereinafter, and will be seen to be triggered via signalling on the interchip GLB 374 line. A jam is implemented by the MCU 302 executing code which has the effect of instructing "when you see GLB 374 asserted, go to a certain address", conditionally, or unconditionally as desired.

Still another feature of the invention used in conjunction with the global line is the broadcast feature. This is the ability of one chip to transmit data on the data bus to all other chips at once. This can be implemented by having each chip go to a wait-box when they are signalled that a broadcast will occur (or is expected). The chip that's going to perform the broadcast, knows it based on the code sequence and flags in its distributed control. This chip causes its global pin output to be asserted which, in the preferred embodiment, has the effect of causing all the other chips to exit their wait-boxes. The chip to broadcast knows it is to write onto the system bus, all the other chips will read the bus, and everything will be synchronized. All the reading chips read the bus simultaneously.

The next operation to be described is the binary search. This operation exemplifies how the GLB 374 (global), TDWN 373, and RUP 371 lines are used by the distributed hardware to implement a hardware binary search thereby achieving another objective of the invention.

Each chip in the array of the preferred embodiment contains a binary search engine. One of the major functions of this engine is to make the memory content addressable. When more than one chip is used in a single system, some method must be provided to extend the internal binary search to the entire array.

Two basic assumptions are made about the data in the array. It is assumed that in the normal case, all of the keys in one chip will be greater than the keys in lower numbered chips and less than keys in higher numbered chips. It is also assumed that there should be no way that a software error could produce a hardware failure. This assumption leads to the conclusion that the binary search must work properly when the data is sorted and must not damage the hardware if the data is not sorted. Hardware failure could occur if two chips both decide that they possess the currently selected key and attempt to drive the (shared) data bus at once.

The following is a description of how the extended search is implemented and how the interchip communication lines of the array are used.

Since each chip must be able to function as an individual unit, the binary search begins internally to each chip. At this time, all chips in the system are running the internal binary search concurrently and asynchronously. There is no communication between the chips during the internal search, but each chip, in the preferred embodiment, has a special hardware flag set which causes it to "listen" to the GLB 374 line. When the global line is asserted, the asynchronous operation will be terminated and all of the chips will be forced (jammed) to begin execution of a synchronizing routine.

In the binary search, the intention is to find the first occurence of a record which has a key metching the key given. If this record (or the location where it should be) is somewhere in the middle of the chip, then there is no ambiguity involved in finding it. Once a chip has realized that it definitely possesses the location where the record is (or should be), then that chip asserts the global line and forces itself and all other chips to the synchronization routine. It the key searched for (or its location) is found to be at either end of the chip's internal RAM 301, then a local search, described immediately hereafter, is entered.

If the key searched for is found to be greater than all keys contained in the particular chip and it is known that more data exists (i.e., the chip does not contain the last record), then the location searched for clearly resides in some chip with a greater chip indentification number. (It should be recalled that each chip can be made to know its number by performing the previously described chip enumeration process.) To inform the next chip of this condition, the TDWN 373 line is asserted continuously until the global line is asserted by some other chip causing execution of the synchronizing routine (to be described hereinafter).

If the key searched for is found to be less than all keys contained in the particular chip and it is known that the particular chip is not the first chip in the chain of chips, then the location searched for may or may not reside at the beginning of the particular chip. In this case, the chip will continuously sample its RUP 371 line until it either comes true of until the global line is asserted by some other chip, causing execution of the synchronizing routine.

If the RUP 371 line is asserted before the global line, then it is known that the previous chip contains no key which is greater than or equal to the key being searched for. With this information, the particular chip can claim the found location by asserting the global line and forcing itself and all other chips to execute the synchronizing routine.

The synchronizing routine in the preferred embodiment of the invention does not do any real computation. It is really a side effect of the fact that all of the chips are identical and are waiting on the same condition (the global line), and are forced to the same routine at the same time by the global line. This synchronization is necessary for the next step, which is the global search.

In addition to synchronizing the chips, the synchronizing routine disables the hardware flag which caused the chips to "listen" to the global line.

Finally, if it were guaranteed that the data in the chips was always sorted, then the global search would not be necessary. Only one chip could ever assert the global line. Since the system is distributed, there is no way to determine that the entire array of chips contain sorted data. This could lead to more than one chip asserting the global line simultaneously (and thus "claiming" the key). Clearly, this is not desirable since the next logical operation would be to inquire about the key and have the chip which claimed the key respond by writing the shared data bus. In order to prevent this bus conflict, all chips will enter the global search.

The global search begins by eliminating all chips which did not initially claim the key. Those chips that wish to claim the key enter a loop which will select exactly one of them.

A description of the algorithm actually implemented by the preferred embodiment of the invention is written immediately hereinafter in pseudo C:

```
chipIdCopy=chipId;
do{
    if (chipIdCopy 0){
        if (global line asserted) deselect self, die
    }
    else{
        assert global line
    }
    chipIdCopy=chipIdCopy/2;
}while (chipIdCopy!=0);
claim key location
assert done line
/*done line will kill any remaining execution*/
```

The "chipId" referenced is the number of the chip in the chip array. This algorithm is essentially a distributed binary selection algorithm. The time required to execute this algorithm is proportional to the log (base 2) of the number of chips in the system.

What has been described is the preferred embodiment of distributed control memory system further comprised of an array of modular, cascadable, integred circuit devices. Each device has been shown to include storage means, programmable on-board processing means and means for interfacing with both the host system and other devices in the array utilizing a single shared bus.

The commands, operations, applications and features described herein demonstrate how the invention may be used to optimize the performance of computing systems by off-loading selected tasks from the host system CPU to distributed contol memory; how the invention permits direct communications between intelligent memory elements in an array of such elements, without host system intervention or supervision; how the use of the bus structure in a computer system may be optimized, particularly where the structure is that of a single bus shared by the host system CPU and the distributed control memory elements; and how to implement a memory element array structure capable of driving a shared bus system, once per clock cycle.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the instant invention and its practical application to thereby enable others skilled in the art to best utilize the instant invention in various embodiments and with various modifications as are suited to the particular use contemplated. It is intended that the scope of the instant invention be defined by the claims appended hereto.

What is claimed is:

1. A high speed distributed control memory system, coupled to a host system processor via a data bus, comprising:
   (a) an array of modular/memory elements, connected in cascade with adjacent memory elements and further connected to said data bus, each being independently operative to store and process data, communicate with said host processor over said data bus, and directly communicate with other memory elements of said array;
   (b) position reference means, coupled to the first and last memory elements of said array, for indicating to said first and last elements their physical position along said data bus in said array;
   (c) host interface means, coupled between said host processor and said array of elements, to separate memory element to memory element communications over said data bus, from memory element to host processor communications over said data bus; and
   (d) a system clock, coupled to said host processor and each of said memory array elements, for synchronizing the operations of said host processor and said memory array elements.

2. A memory system as set forth in claim 1 wherein said memory element to memory element communication may be performed independent of the supervision and control of said host processor.

3. A memory system as set forth in claim 1 further comprising a direct, data bus independent, communication path between adjacent memory elements for carrying memory element to memory element communication signals between said adjacent memory elements.

4. A memory system as set forth in claim 1 wherein said data bus is capable of being driven by the memory elements of said array at the rate of once per clock cycle.

5. A memory system as set forth in claim 1 wherein said host interface means further comprises a transceiver.

6. A memory system as set forth in claim 1 wherein said position indicating means further comprises a power supply.

7. A memory system as set forth in claim 1 wherein each of said modular memory elements further comprises:
   (a) storage means;
   (b) distributed control means, capable of data processing, coupled to said storage means, for controlling the storing and retrieving of data into and from said storage means; and
   (c) interface means, coupled between said data bus and both said distributed control means and said storage means, for selectively channelling command and data signals from said data bus to said distributed control means and said storage means.

8. A memory system as set forth in claim 7 wherein said interface means is operative to channel data signals, from said storage means and said distributed control means, to said data bus.

9. A memory system as set forth in claim 8 wherein each of said memory elements further includes an internal data bus for carrying said data signals within each memory element.

10. A memory system as set forth in claim 9 wherein each of said memory elements further includes an internal command bus for carrying said command signals.

11. A memory system as set forth in claim 8 which further includes a communication path, coupled between said host processor and each of said interface means, for channelling control signals from said host processor to selected memory elements and for channelling status signals from selected memory elements to said host processor.

12. A memory system as set forth in claim 11 wherein said communication path between said host processor and each of said interface means may be used to input any of a set of preselected host interface signals from said host processor to the distributed control means of a selected memory element.

13. A memory system as set forth in claim 12 wherein said communication path between said host processor and each of said interface means may be used to output any of a set of preselected host interface signals from a given memory element to said host processor.

14. A memory system as set forth in claim 12 wherein said set of host interface input signals includes signals for enabling the reading and writing of data, from and into respectively, memory elements in said array selected by said host processor and wherein said selected memory elements are operative in response to said enabling signals to enable the reading and writing of data.

15. A memory system as set forth in claim 12 wherein said set of host interface input signals includes a reset signal which when communicated to said array causes each memory element to identify itself in terms of its physical location in the array.

16. A memory system as set forth in claim 13 wherein said communication path further comprises a set of individual control links, each designated to carry one of said preselected set of host interface signals.

17. A memory system as set forth in claim 8 further comprising a first and a second direct link between the interface means of adjacent memory elements, for carrying direct communication signals between said adjacent memory elements.

18. A memory system is set forth in claim 17 wherein a first adjacent memory element generates a transmit signal, which is communicated to a second adjacent memory element over said direct link, to signal that data will be transmitted by said first element to said second element, over said data bus, during an upcoming, single clock interval.

19. A memory system as set forth in claim 18 wherein said first adjacent memory element is operative to write said data onto said data bus during said upcoming single clock interval.

20. A memory system as set forth in claim 19 wherein said second adjacent memory element is operative in response to said transmit signal to read the data bus during said upcoming single clock interval.

21. A memory system as set forth in claim 20 wherein said second adjacent memory element is operative during said clock interval to acknowledge a completed read of said data bus.

22. A memory system as set forth in claim 21 wherein said signal acknowledging the completion of a read is communicated to said first adjacent memory element via said second direct link between said adjacent memory elements.

23. A memory system as set forth in claim 22 further comprising means for directly broadcasting a control signal generated by any one of said memory elements to all the other memory elements of said array.

24. A memory system as set forth in claim 23 wherein said distributed control processor further comprises:
   (a) a micro-control processor unit; and
   (b) an execution control unit.

25. A memory system as set forth in claim 24 wherein said broadcasted control signal may be used to conditionally and unconditionally force the micro-control processor unit of a given memory element to execute a preselected microcode instruction string.

26. A memory system as set forth in claim 25 wherein each of said memory elements further comprises means to facilitate interconnecting banks of cascaded memory elements.

27. A memory system as set forth in claim 26 wherein said interface means further comprises latch means for buffering commands and data between said data bus and both the internal data and command buses in each of said memory elements.

28. A memory system as set forth in 27 wherein each of said modular memory array elements is an integrated circuit device.

29. A method for distributing the control of a memory system, coupled to a host system processor via a data bus, and operating said memory system at high speed, comprising the steps of:
   (a) connecting adjacent ones of an array of modular memory elements in cascade and further connecting each memory element to said data bus, each being independently operative to store and process data, communicate with said host processor over said data bus, and directly communicate with other memory elements of said array;
   (b) indicating to the first and last of said memory elements their physical position along said data bus in said array by utilizing position referencing means coupled to said first and last elements;
   (c) separating memory element to memory element communications over said data bus, from memory element to host processor communications over said data bus by coupling host interface means between said host processor and said array of elements; and (d) synchronizing the operations of said host processor and said array of memory elements via use of a system clock.

30. A method as set forth in claim 29 futher comprising the step of performing memory element to memory element communication independent of the supervision and control of said host processor.

31. A method as set forth in claim 29 further comprising the step of directly communicating between adjacent memory elements by transmitting communication signals over a direct, data bus independent, communication path between said adjacent memory elements.

32. A method as set forth in claim 29 further comprising the step of driving said data bus, via said memory elements, at the rate of once per clock cycle.

33. A method as set forth in claim 29 wherein the step of separating is implemented by utilizing a transceiver.

34. A method as set forth in claim 29 wherein said step of indicating is implemented by tying a power supply input to said first and last element of said array.

35. A method as set forth in claim 29 wherein the operation of each said modular memory elements further comprises the steps of:
(a) storing and retrieving data from a storage means;
(b) controlling the storing and retrieving of data, into and from said storage means, via distributed control means capable of data processing; and
(c) channelling, selectively, command and data signals from said data bus to said distributed control means and said storage means via interface means, coupled between said data bus and both said distributed control means and said storage means.

36. A method as set forth in claim 35 further comprising the step of channelling data signals, from said storage means and said distributed control means, to said data bus via said interface means.

37. A method as set forth in claim 36 further comprising the step of carrying said data signals within each memory element on an internal data bus.

38. A method as set forth in claim 37 further comprising the step of carrying said command signals within each memory element on an internal command bus.

39. A method as set forth in claim 38 which further includes the steps of channelling control signals from said host processor to selected memory elements and channelling status signals from selected memory elements to said host processor, both via a communication path coupled between said host processor and each of said interface means.

40. A method as set forth in claim 39 further including the step of inputting any of a set of preselected host interface signals from said host processor to the distributed control means of a selected memory element via said communication path between said host processor and each of said interface means.

41. A method as set forth in claim 40 further including the step of outputting any of a set of preselected host interface signals from a given memory element to said host processor via said communication path between said host processor and each of said interface means.

42. A method as set forth in claim 40 wherein said set of host interface input signals includes signals for enabling the reading and writing of data, from and into respectively, memory elements in said array selected by said host processor.

43. A method as set forth in claim 40 further including the step of identifying each memory element in terms of its physical location in said array in response to a host interface input reset signal.

44. A method as set forth in claim 41 further including the step of designating an individual control link to carry one of said preselected set of host interface signals when said communication path is comprised of a set of individual control links.

45. A method as set forth in claim 36 further comprising the step of carrying direct communication signals between adjacent memory elements over a first and a second direct link between the interface means of said adjacent memory elements.

46. A method is set forth in claim 45 further comprising the steps of generating a transmit signal, via a first adjacent memory element, and communicating said transmit signal to a second adjacent memory element, over said direct link, to signal that data will be transmitted by said first element to said second element, over said data bus, during an upcoming, single clock interval.

47. A method as set forth in claim 46 further comprising the step of writing said data from said first adjacent memory element onto said data bus during said upcoming single clock interval.

48. A method as set forth in claim 47 further comprising the step of reading data from said data bus during said upcoming single clock interval in response to said transmit signal.

49. A method as set forth in claim 48 further comprising the step of acknowledging a completed read of said data bus by said second adjacent memory element during said clock interval 50. A method as set forth in claim 49 further comprising the step of communicating said signal acknowledging the completion of a read to said first adjacent memory element via said second direct link between said adjacent memory elements.

51. A method as set forth in claim 50 further comprising the step of broadcasting, directly, a control signal generated by any one of said memory elements to all the other memory elements of said array.

52. A method as set forth in claim 51 further comprising the step of performing said distributed control processor function via the combination of a micro-control processor unit and a cooperating execution control unit.

53. A method as set forth in claim 52 further comprising the step of forcing, conditionally and unconditionally, the micro-control processor unit of a given memory element to execute a preselected micro-code instruction string in response to said broadcasted control signal.

54. A method as set forth in claim 53 further comprising the step of interconnecting banks of cascaded memory elements.

55. A method as set forth in claim 54 further comprising the steps of latching and buffering commands and data, between said data bus and both the internal data bus and command bus in each of said memory elements, via said interface means.

56. A method as set forth in claim 55 further comprising the step of fabricating each of said modular memory array elements in the form of an integrated circuit device.

* * * * *